US012768678B2

(12) United States Patent
Okamoto et al.

(10) Patent No.: US 12,768,678 B2
(45) Date of Patent: Oct. 20, 2026

(54) OPTICAL FIBER SENSING DEVICE AND OPTICAL FIBER SENSING METHOD

(71) Applicant: NTT, Inc., Tokyo (JP)

(72) Inventors: Tatsuya Okamoto, Musashino (JP); Daisuke Iida, Musashino (JP); Yusuke Koshikiya, Musashino (JP)

(73) Assignee: NTT, Inc., Tokyo (JP)

( * ) Notice: Subject to any disclaimer, the term of this patent is extended or adjusted under 35 U.S.C. 154(b) by 128 days.

(21) Appl. No.: 18/853,542

(22) PCT Filed: May 6, 2022

(86) PCT No.: PCT/JP2022/019571

§ 371 (c)(1),
(2) Date: Oct. 2, 2024

(87) PCT Pub. No.: WO2023/214463

PCT Pub. Date: Nov. 9, 2023

(65) Prior Publication Data

US 2025/0237533 A1 Jul. 24, 2025

(51) Int. Cl.
*G01D 5/353* (2006.01)

(52) U.S. Cl.
CPC .................................. *G01D 5/353* (2013.01)

(58) Field of Classification Search
CPC .............. G01D 5/353; G01D 5/35361; G01M 11/3172; G01L 1/242
See application file for complete search history.

(56) References Cited

U.S. PATENT DOCUMENTS

| | | | | |
|---|---|---|---|---|
| 11,499,849 | B2 * | 11/2022 | Waagaard | G01D 5/35306 |
| 2004/0022547 | A1 * | 2/2004 | Szafraniec | H04B 10/60 398/202 |

(Continued)

FOREIGN PATENT DOCUMENTS

| | | | |
|---|---|---|---|
| JP | 2015105909 A | * | 6/2015 |
| JP | 2018185278 A | * | 11/2018 |
| JP | 2019060666 A | * | 4/2019 |

OTHER PUBLICATIONS

Yang, Hongzhen et al. "Noise Reduction for Time-Domain Sensing Signal of Brillouin Scattering Based on Time Series Analysis and Kalman Filter Algorithm". 2019 IEEE International Conference on Energy Internet (ICEI), Nanjing, China, 2019, pp. 232-237. (Year: 2019).*

(Continued)

*Primary Examiner* — Michael A Lyons

(57) ABSTRACT

An optical fiber sensing device is presented which includes an analysis circuit that executes obtaining a change rate of a spectral shift by time-differentiating a measured spectrum shift, detecting a discontinuity point of the spectrum shift from the change rate, calculating a predicted value of the change rate for the discontinuity point, estimating an estimated value of the change rate at the discontinuity point by applying a Kalman filter to the change rate at the discontinuity point and the predicted value at the discontinuity point, and acquiring a corrected spectrum shift by time-integrating the change rate other than the discontinuity point and the estimated value estimated at the discontinuity point.

8 Claims, 7 Drawing Sheets

(56) References Cited

U.S. PATENT DOCUMENTS

| | | | | |
|---|---|---|---|---|
| 2016/0370177 | A1* | 12/2016 | Laine | G01B 11/16 |
| 2022/0260428 | A1* | 8/2022 | Keaveney | G01B 9/02004 |

OTHER PUBLICATIONS

Feng, Kunpeng et al. "Robustness- and Processing-Rate-Improved OFDR Based on Local Search and Kalman Prediction". IEEE Photonics Technology Letters, vol. 34, No. 24, Dec. 15, 2022, pp. 1325-1328. (Year: 2022).*

M. Froggatt and J. Moore, "High-spatial-resolution distributed strain measurement in optical fiber with Rayleigh scatter", Appl. Opt., vol. 37, No. 10, pp. 1735-1740, 1998.

Childers, Brooks A., et al. "Recent developments in the application of optical frequency domain reflectometry to distributed Bragg grating sensing". Fiber Optic Sensor Technology and Applications 2001. vol. 4578. International Society for Optics and Photonics, 2002.

Tatsuya Okamoto, Daisuke Iida, and Hiroyuki Oshida. "Vibration-induced beat frequency offset compensation in distributed acoustic sensing based on optical frequency domain reflectometry". Journal of Lightwave Technology 37.18 (2019): 4896-4901.

Labbe, Roger. "Kalman and bayesian filters in python". (2014): 4.(https://elec3004.uqcloud.net/2015/tutes/Kalman_and_Bayesian_Filters_in_Python.pdf), retrieved on Apr. 13, 2022.

* cited by examiner

-PRIOR ART-

-PRIOR ART-

OPTICAL FIBER SENSING DEVICE AND OPTICAL FIBER SENSING METHOD

CROSS-REFERENCE TO RELATED APPLICATIONS

This application is a 371 U.S. National Phase of International Application No. PCT/JP2022/019571, filed on May 6, 2022. The entire disclosure of the above application is incorporated herein by reference.

TECHNICAL FIELD

The present disclosure relates to an optical fiber sensing device using optical frequency domain reflectometry (OFDR) and a sensing method thereof.

BACKGROUND ART

FIG. 1 is a diagram illustrating a sensing principle using OFDR. OFDR employs frequency swept light as probe light. Then, a spectrum S(υ) (FIG. 1B) can be analyzed by performing Fourier transform of a waveform r(τ) (FIG. 1A) of the Rayleigh backscattered light with respect to the probe light of the optical fiber (see, for example, Non Patent Literature 1).

The spectrum S(υ) of the backscattered light varies with the strain or temperature of the optical fiber (spectrum shift). Therefore, by detecting an extent of shift in the reference spectrum $S_{ref}$, obtained by the reference measurement, at each time of measurement (spectrum shift Δυ), a change amount in strain or temperature of the optical fiber can be calculated, as shown in the following expression.

[Math. 1]

$$-\frac{\Delta\nu}{\nu_0} = 0.78\varepsilon + 6.92\times10^{-6}T \quad (1)$$

Here, Δυ is a spectrum shift, $\upsilon_0$ is a center frequency of probe light, ε is strain, and T is a temperature.

CITATION LIST

Non Patent Literature

Non Patent Literature 1: M. Froggatt and J. Moore, "High-spatial-resolution distributed strain measurement in optical fiber with Rayleigh scatter", Appl. Opt., vol. 37, no. 10, pp. 1735-1740, 1998.

Non Patent Literature 2: Childers, Brooks A., et al. "Recent developments in the application of optical frequency domain reflectometry to distributed Bragg grating sensing". Fiber Optic Sensor Technology and Applications 2001. Vol. 4578. International Society for Optics and Photonics, 2002.

Non Patent Literature 3: Okamoto, Tatsuya, Daisuke Iida, and Hiroyuki Oshida. "Vibration-induced beat frequency offset compensation in distributed acoustic sensing based on optical frequency domain reflectometry". Journal of Lightwave Technology 37.18 (2019): 4896-4901.

Non Patent Literature 4: Labbe, Roger. "Kalman and bayesian filters in python". (2014): 4. (https://elec3004.uqcloud.net/2015/tutes/Kalman_and_Bayesian_Filters_in_Python.pdf), retrieved on Apr. 13, 2022

SUMMARY OF INVENTION

Technical Problem

In performing OFDR, a significant vibration applied to the optical fiber causes a polarization state change (see, for example, Non Patent Literature 2) and/or an irregularity in optical frequency (see, for example, Non Patent Literature 3) of the probe light, and an intermittent change in state of the probe light. Due to the variation of the probe light, the optical spectrum does not have a consistent spectral structure as in FIG. 2(A), and a spectrum shift obtained from cross-correlation (FIG. 2(B)) causes a discontinuous measurement error as in FIG. 2(C).

That is, optical fiber sensing by the OFDR has a problem that accurate measurement is difficult in a case where strain or temperature change of a measurement object is large. Therefore, in order to solve the above problems, an object of the present invention is to provide an optical fiber sensing device and an optical fiber sensing method that enable accurate measurement even under the condition that strain or temperature change of a measurement target is significant.

Solution to Problem

In order to achieve the above object, in an optical fiber sensing device and a method thereof according to the present invention, a Kalman filter is applied to a discontinuity point of a spectrum shift to estimate a temporal change of a proper spectrum shift.

Specifically, an optical fiber sensing device according the present invention is an optical fiber sensing device using OFDR, the device including an analysis circuit that executes obtaining a change rate of a spectrum shift by time-differentiating a measured spectrum shift, detecting a discontinuity point of the spectrum shift from the change rate, calculating a predicted value of the change rate for the discontinuity point, estimating an estimated value of the change rate at the discontinuity point by applying a Kalman filter to the change rate at the discontinuity point and the predicted value at the discontinuity point, and acquiring a corrected spectrum shift by time-integrating the change rate other than the discontinuity point and the estimated value estimated at the discontinuity point.

In addition, an optical fiber sensing method according to the present invention is an optical fiber sensing method using OFDR, the method including obtaining a change rate of a spectrum shift by time-differentiating a measured spectrum shift, detecting a discontinuity point of the spectrum shift from the change rate, calculating a predicted value of the change rate for the discontinuity point, estimating an estimated value of the change rate at the discontinuity point by applying a Kalman filter to the change rate at the discontinuity point and the predicted value at the discontinuity point, and acquiring a corrected spectrum shift by time-integrating the change rate other than the discontinuity point and the estimated value estimated at the discontinuity point.

In the optical fiber sensing device, the discontinuity point of the spectrum shift generated in a case where the strain or the temperature change of the measurement object is significant can be resolved by the Kalman filter, and the time waveform of the spectrum shift can be smoothed. Therefore, the present invention can provide an optical fiber sensing device and an optical fiber sensing method that enable accurate measurement even under the condition that strain or temperature change of a measurement target is significant.

Before the application to the Kalman filter, first, a predicted value of the change rate of the spectrum shift is obtained for the detected discontinuity point under the condition that the change rate of the spectrum shift does not change rapidly.

For example, the predicted value is the change rate at a time immediately before a time indicating the discontinuity point.

Next, under the condition that the uncertainty of the predicted value of the change rate of the spectrum shift is smaller than its own noise, the Kalman filter is applied to the detected discontinuity point to estimate the correct change rate (estimated value) of the spectrum shift. Specifically, the Kalman filter estimates the estimated value by Expression (C1).

[Math. C1]

$$\hat{m} = \frac{\sigma_m^2 \cdot p + \sigma_p^2 \cdot m}{\sigma_m^2 + \sigma_p^2} \tag{C1}$$

Where $\hat{m}$ the estimated value, m is the change rate at the discontinuity point, p is the predicted value, $\sigma_m$ is noise of the optical fiber sensing device, and $\sigma_p$ is uncertainty of prediction.

Here, the noise $\sigma_m$ and the uncertainty $\sigma_p$ are set to $\sigma_m > \sigma_p$, and a standard deviation of the corrected spectrum shift with respect to time is set to a value smaller than a standard deviation of the spectrum shift with respect to time.

Further, the analysis circuit can also be implemented by a computer and a program, and the program can be recorded in a recording medium or provided through a network.

Note that the above inventions can be combined in any possible manner.

Advantageous Effects of Invention

The present invention can provide an optical fiber sensing device and an optical fiber sensing method that enable accurate measurement even under the condition that strain or temperature change of a measurement target is significant.

DESCRIPTION OF EMBODIMENTS

Figure 1:
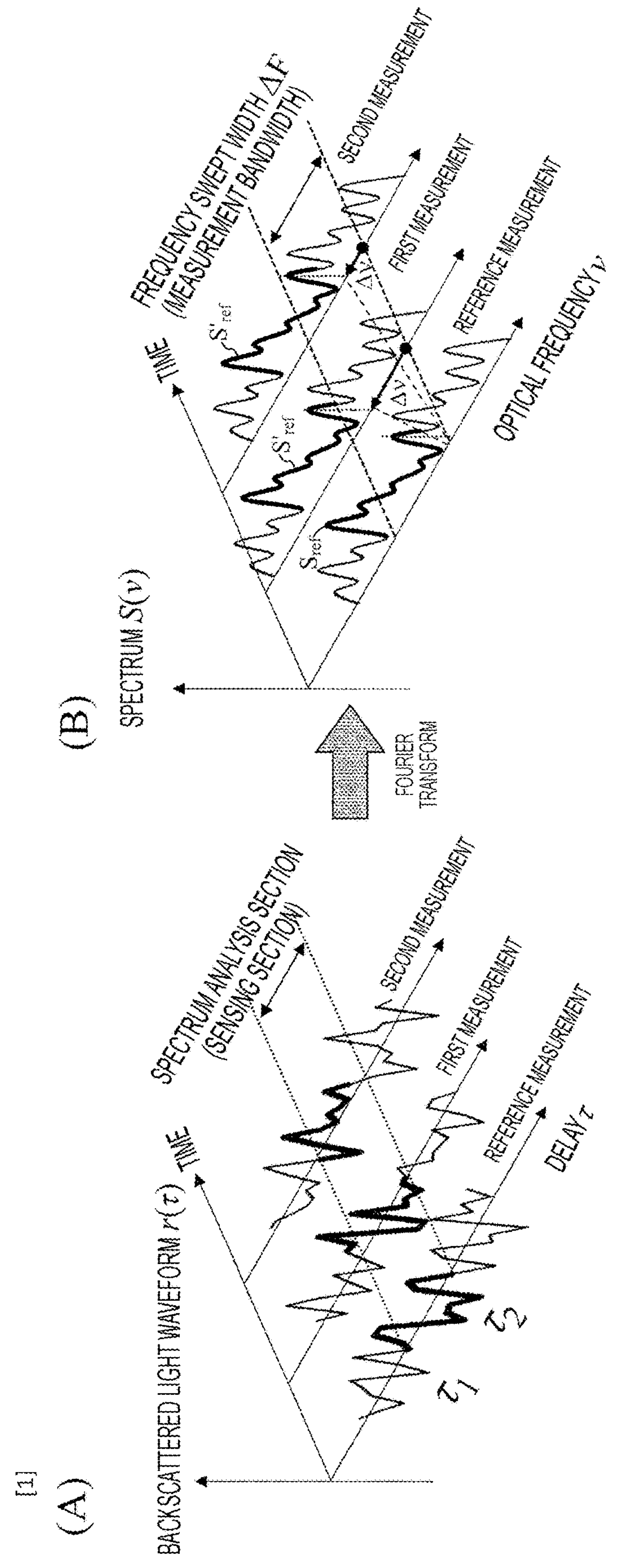
FIG. 1 is a diagram illustrating a sensing principle using OFDR.
Figure 2:
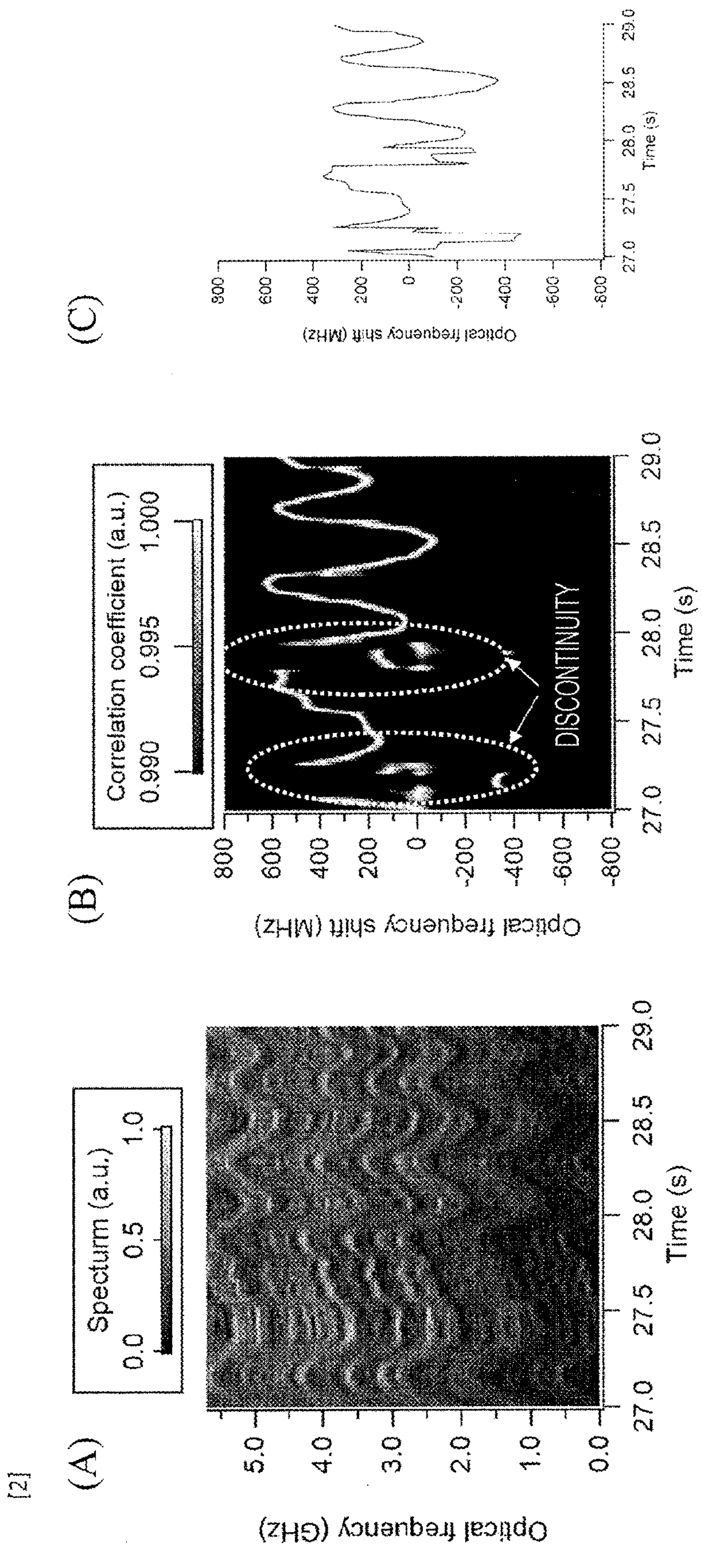
FIG. 2 is a diagram describing a problem of the present invention.

Embodiments of the present invention will be described with reference to the accompanying drawings. The embodiment to be described below is an example of the present invention, and the present invention is not limited to the embodiment to be described below. Components assigned the same reference numerals in the present specification and the drawings are the same components.

Figure 3:
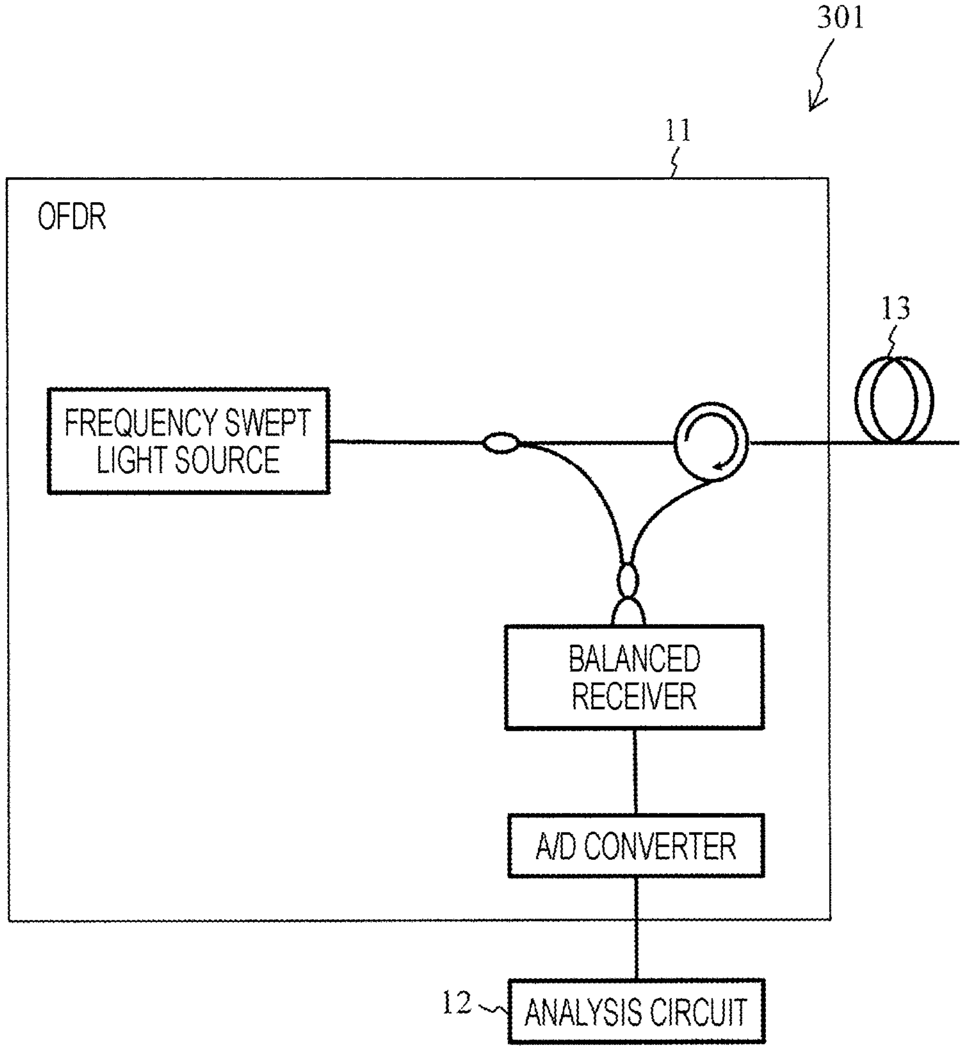
FIG. 3 is a diagram illustrating an optical fiber sensing device according to the present invention.

FIG. 3 is a diagram illustrating an optical fiber sensing device 301 according to the present embodiment. The optical fiber sensing device 301 is a sensing system including a measurement device 11 and an analysis circuit 12. The measurement device 11 is an OFDR that inputs probe light having a frequency swept once to the optical fiber 13 and acquires a spectrum of Rayleigh backscattered light in the optical fiber 13.

The analysis circuit 12 acquires a spectrum shift S from the time variation of the spectrum obtained by the measurement device 11. Then, the analysis circuit 12 time-differentiates the spectrum shift S to detect a discontinuity point of the spectrum shift. Further, the analysis circuit 12 applies a Kalman filter (see, for example, Non Patent Literature 4) to the discontinuity point to estimate the temporal change (estimated value) of the proper spectrum shift. Finally, the analysis circuit 12 integrates the temporal change of the spectrum shift to obtain a corrected spectrum shift. Hereinafter, the analysis method of the analysis circuit 12 will be described in detail.

Figure 4:
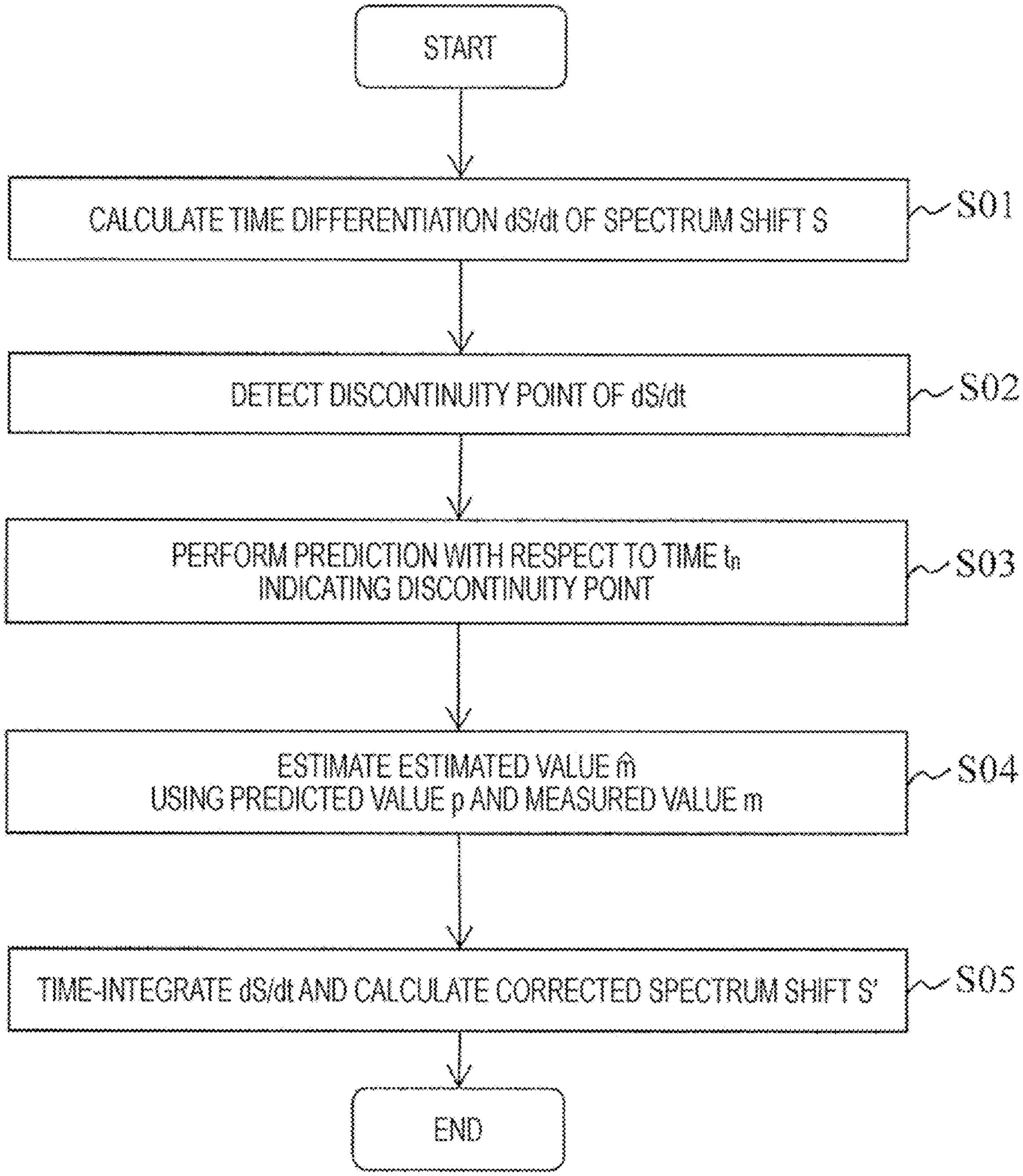
FIG. 4 is a diagram illustrating an optical fiber sensing method according to the present invention.

FIG. 4 is a diagram illustrating an analysis method performed by the analysis circuit 12.

The analysis circuit 12 performs acquiring a change rate dS/dt of a spectrum shift S by time-differentiating the measured spectrum shift S (step S01),

- detecting a discontinuity point of the spectrum shift S from the change rate dS/dt (step S02),
- calculating a predicted value p of a change rate dS/dt with respect to a time $t_n$ indicating the discontinuity point (step S03),
- estimating an estimated value $\hat{m}$ of the change rate at a time $t_n$ indicating the discontinuity point by applying a Kalman filter to a measured value m and the predicted value p of the change rate at the time $t_n$ indicating the discontinuity point (step S04), and
- time-integrating the change rate dS/dt other than the discontinuity point and the estimated value $\hat{m}$ estimated at the discontinuity point to acquire a corrected spectrum shift S' (step S05).

[Step S01]

The change rate ds/dt is calculated by time-differentiating the acquired spectrum shift S.

[Step S02]

Figure 5:
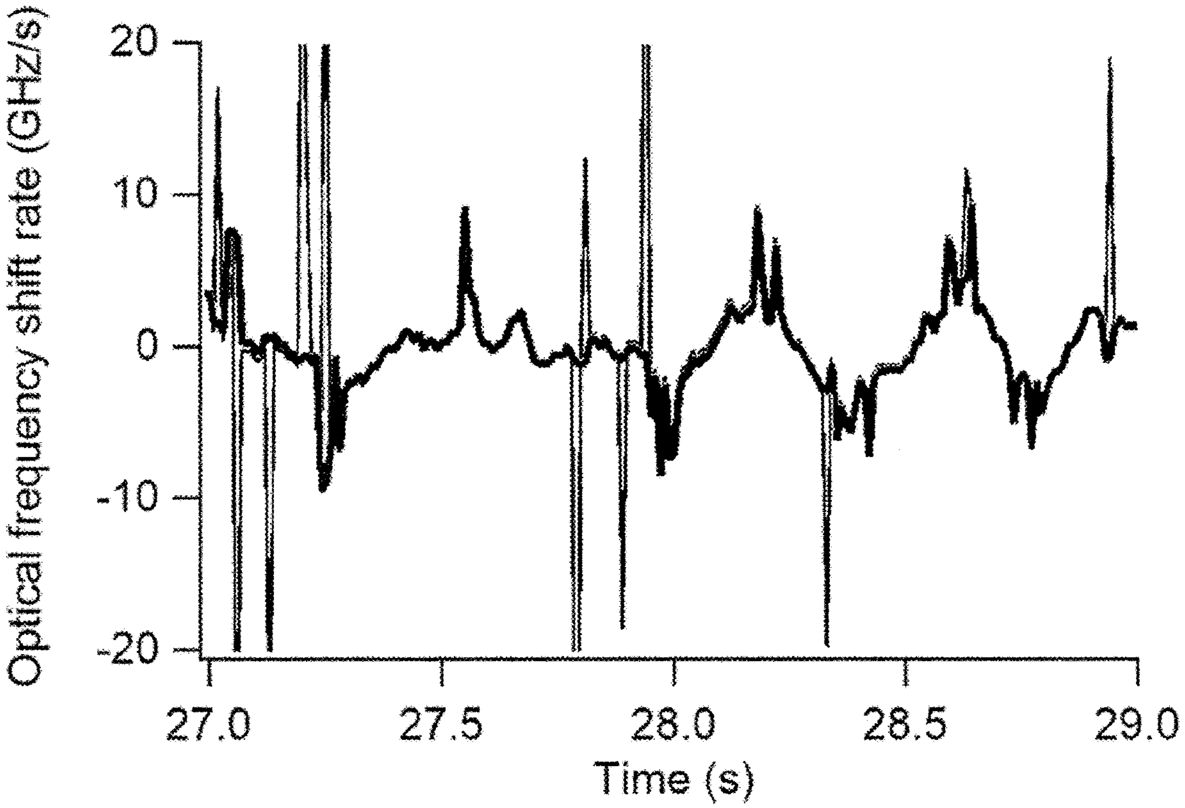
FIG. 5 is a diagram illustrating an effect of the optical fiber sensing method according to the present invention.

A discontinuity point of the spectrum shift S is detected from the value of the change rate ds/dt. For example, a time at which the value of the change rate ds/dt exceeds a predetermined threshold can be set as a discontinuity point. FIG. 5 is a diagram illustrating a change rate of the spectrum shift S. The vertical axis represents the change rate ds/dt, and the horizontal axis represents time. The change rate dS/dt is obtained by time-differentiating the spectrum shift S acquired by the thin line, and a peak occurs at random time. The time at which this peak occurs (for example, time $t_n$) is the discontinuity point of the spectrum shift.

[Step S03]

Usually, since the sampling rate of an A/D converter included in the measurement device 11 is sufficiently higher than the frequency of the measurement target (vibration or temperature change received by the optical fiber 13), the change rate ds/dt does not change sharply. Using this characteristic, prediction is performed at the change rate at time $t_{n-1}$ with respect to time $t_n$ indicating the discontinuity point of the spectrum shift. Specifically, the peak value of the thin line in FIG. 5 (the value of the change rate ds $(t_n)$/dt at the time $t_n$) is replaced with the change rate (predicted value p) at the immediately preceding time $t_{n-1}$.

$$\text{Predicted value } p = dS(t_{n-1})/dt$$

[Step S04] On the assumption that the noise of the optical fiber sensing device 301 is numerically greater than the prediction uncertainty, the Kalman filter estimates the estimated value m̂ by Expression (C1).

[Math. C1]

$$\hat{m} = \frac{\sigma_m^2 \cdot p + \sigma_p^2 \cdot m}{\sigma_m^2 + \sigma_p^2} \tag{C1}$$

Where, m̂ is the estimated value, m is the change rate (observation value) at the discontinuity point, p is the predicted value, Om is noise of the optical fiber sensing device 301, and $\sigma_p$ is uncertainty of prediction.

The Kalman filter does not function correctly unless the measuring instrument noise $\sigma_m$ and the uncertainty $\sigma_p$ of the predicted value are grasped. $\sigma_m$ represents the standard deviation of the discontinuity of the spectrum shift. $\sigma_m$ is not known exactly, since no statistical property on the discontinuity of the spectrum shift is obtained. Therefore, in the present embodiment, it is assumed that $\sigma_m$ is a great value and can take any value.

On the other hand, $\sigma_p$ represents uncertainty of the prediction value p. Provided that the sampling rate of the A/D converter included in the measurement device 11 is sufficiently higher than the frequency of the phenomenon (vibration or temperature change) that is a measurement target, the change rate of the spectrum shift is supposed not to change significantly within a range of times between the time to and the time $t_{n-1}$. Therefore, $\sigma_p$ is set to a value smaller than $\sigma_m$.

Figure 6:
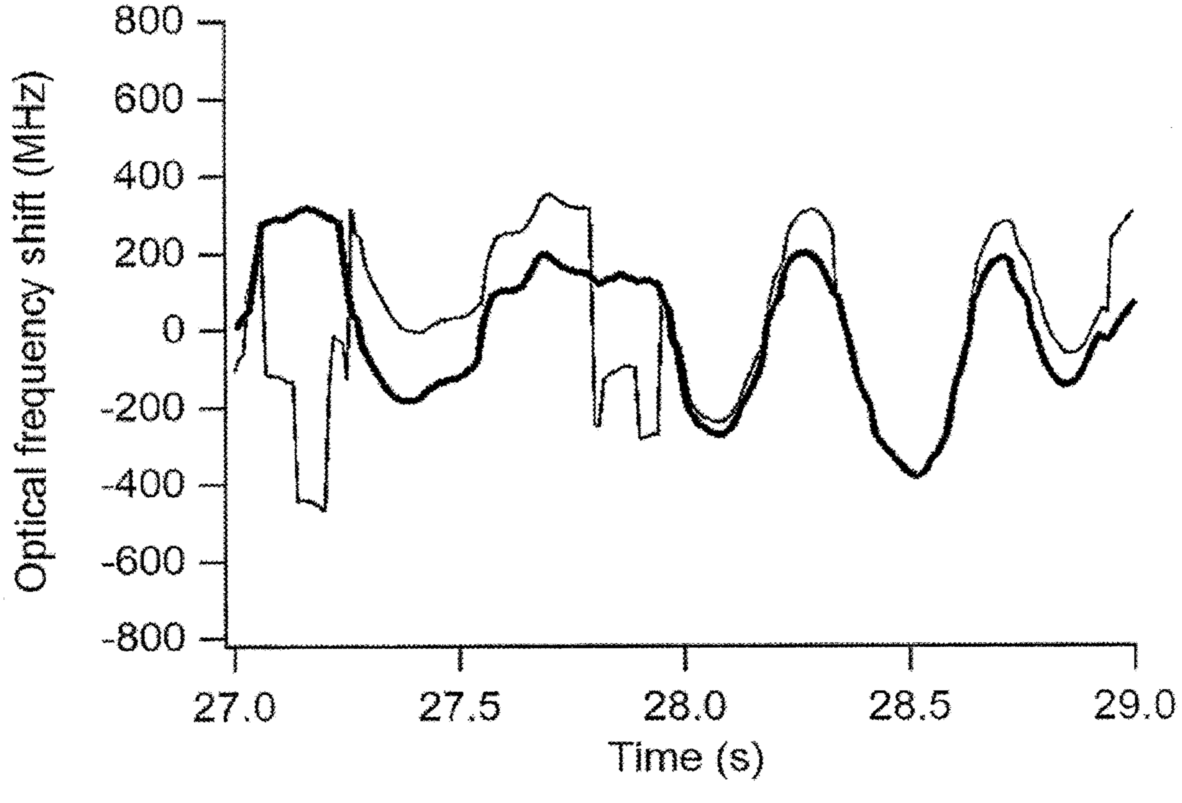
FIG. 6 is a diagram illustrating an effect of the optical fiber sensing method according to the present invention.

[Step S05] A thick line in FIG. 5 indicates the change rate of the spectrum shift after the change rate (observation value m) of the discontinuity point of the spectrum shift S is replaced with the estimated value m̂ estimated in step S04 in this step. The change rate of this spectrum shift is time-integrated to obtain the corrected spectrum shift S'. FIG. 6 is a diagram comparing the spectrum shift S (thin line) and the corrected spectrum shift S' (thick line). The corrected spectrum shift S' has a smooth waveform with respect to the spectrum shift S.

At this time, it is preferable to set the values of $\sigma_m$ and $\sigma_p$ to the analysis circuit 12 such that the standard deviation of the corrected spectrum shift S' with respect to time is smaller than the standard deviation of the spectrum shift S with respect to time.

Effects

Figure 7:
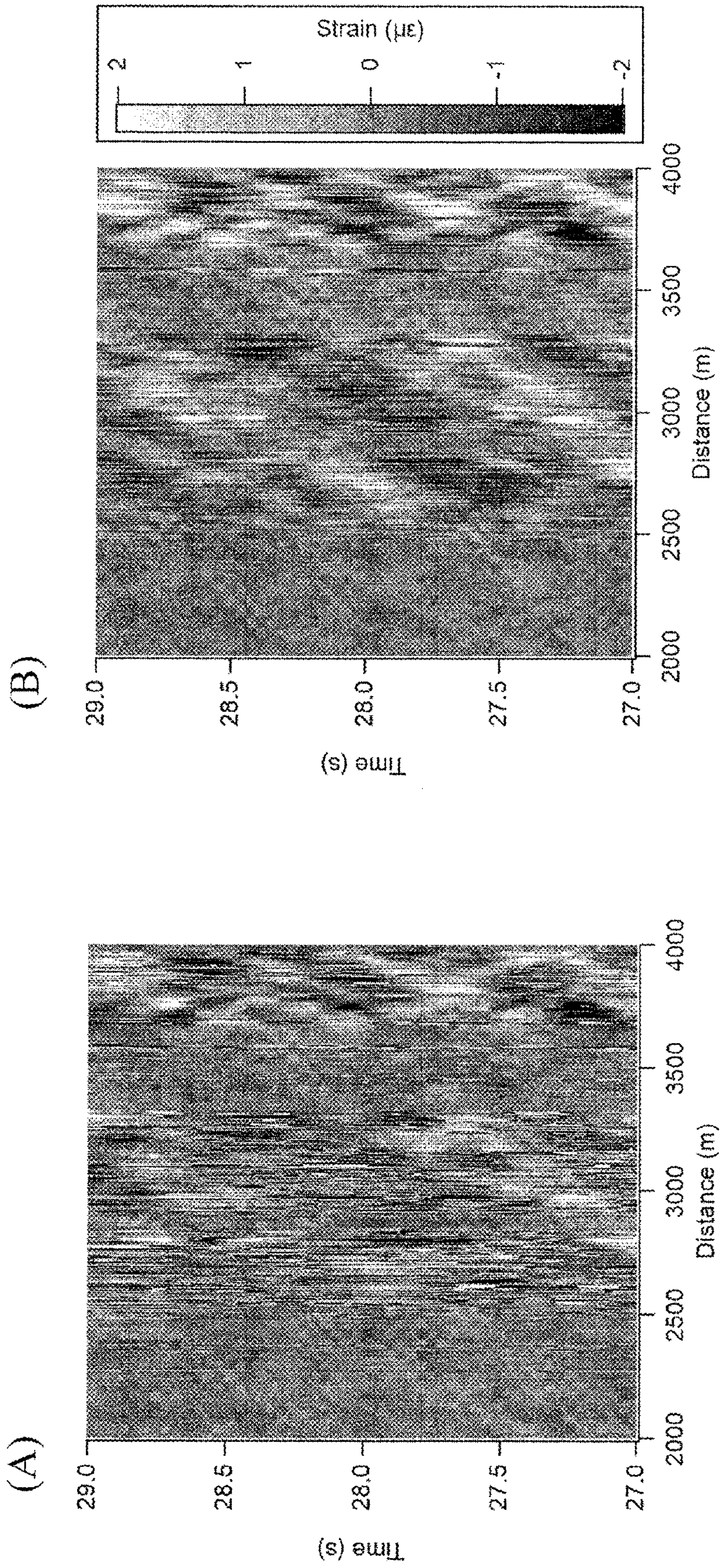
FIG. 7 is a diagram illustrating an effect of the optical fiber sensing method according to the present invention.

FIG. 7 illustrates a result of measuring the vibration with a large amplitude in the optical fiber 13. FIG. 7(A) is a diagram illustrating a vibration distribution measured by the measurement device 11 without being analyzed by the analysis circuit 12. FIG. 7(B) is a diagram illustrating a vibration distribution analyzed by the analysis circuit 12 and corrected. In FIG. 7(A), a vibration distribution in a section (2500 to 3250 m) having a large amplitude is unclear due to measuring instrument noise. On the other hand, in FIG. 7(B), the measuring device noise is reduced, and the vibration distribution is clear.

As described above, the optical fiber sensing device 301 can measure the vibration distribution of the vibration phenomenon in which the amplitude of vibration is significant while suppressing the measuring instrument noise.

REFERENCE SIGNS LIST

11 Measurement device
12 Analysis circuit
13 Optical fiber
301 Optical fiber sensing device

The invention claimed is:

1. An optical fiber sensing device using optical frequency domain reflectometry (OFDR), the device comprising:
- a measurement device that inputs probe light into an optical fiber and acquires a spectrum of backscattered light from the optical fiber; and
- an analysis circuit that acquires a spectrum shift from the spectrum obtained by the measurement device and obtains a change rate of the spectral shift by time-differentiating the spectrum shift, wherein the analysis circuit further operates to
- detect a discontinuity point of the spectrum shift from the change rate,
- calculate a predicted value of the change rate for the discontinuity point,
- estimate an estimated value of the change rate at the discontinuity point by applying a Kalman filter to the change rate at the discontinuity point and the predicted value at the discontinuity point, and
- acquire a corrected spectrum shift by time-integrating the change rate other than the discontinuity point and the estimated value estimated at the discontinuity point.

2. The optical fiber sensing device according to claim 1, wherein the predicted value is the change rate at a time immediately before a time indicating the discontinuity point.

3. The optical fiber sensing device according to claim 1, wherein the Kalman filter estimates the estimated value by Expression (C1)

$$\hat{m} = \frac{\sigma_m^2 \cdot p + \sigma_p^2 \cdot m}{\sigma_m^2 + \sigma_p^2} \tag{C1}$$

where m̂ is the estimated value, m is the change rate at the discontinuity point, p is the predicted value, $\sigma_m$ is noise of the optical fiber sensing device, and $\sigma_p$ is uncertainty of prediction.

4. The optical fiber sensing device according to claim 3, wherein the noise Om and the uncertainty $\sigma_p$ satisfy: $\sigma_m > \sigma_p$, and a standard deviation of the corrected spectrum shift with respect to time is set to a value smaller than a standard deviation of the spectrum shift with respect to time.

5. An optical fiber sensing method using optical frequency domain reflectometry (OFDR), the method comprising:
- inputting, by a measurement device, probe light into an optical fiber;
- acquiring, by the measurement device, a spectrum of backscattered light from the optical fiber;

acquiring, by an analysis circuit, a spectrum shift from the spectrum obtained by the measurement device;

obtaining, by the analysis circuit, a change rate of a spectral shift by time-differentiating the spectrum shift;

detecting, by the analysis circuit, a discontinuity point of the spectrum shift from the change rate;

calculating, by the analysis circuit, a predicted value of the change rate for the discontinuity point;

estimating, by the analysis circuit, an estimated value of the change rate at the discontinuity point by applying a Kalman filter to the change rate at the discontinuity point and the predicted value at the discontinuity point; and acquiring, by the analysis circuit, a corrected spectrum shift by time-integrating the change rate other than the discontinuity point and the estimated value estimated at the discontinuity point.

6. The optical fiber sensing method according to claim 5, wherein the predicted value is the change rate at a time immediately before a time indicating the discontinuity point.

7. The optical fiber sensing method according to claim 5, wherein the Kalman filter estimates the estimated value by Expression (C1)

$$\hat{m} = \frac{\sigma_m^2 \cdot p + \sigma_p^2 \cdot m}{\sigma_m^2 + \sigma_p^2} \quad \text{(C1)}$$

where $\hat{m}$ is the estimated value, m is the change rate at the discontinuity point, p is the predicted value, $\sigma_m$ is noise of the optical fiber sensing device, and $\sigma_p$ is uncertainty of prediction.

8. The optical fiber sensing method according to claim 7, wherein the noise $\sigma_m$ and the uncertainty $\sigma_p$ are set to $\sigma_m > \sigma_p$, and a standard deviation of the corrected spectrum shift with respect to time is set to a value smaller than a standard deviation of the spectrum shift with respect to time.

* * * * *